United States Patent
Caveny et al.

[11] Patent Number: 5,887,547
[45] Date of Patent: Mar. 30, 1999

[54] METHOD FOR MEASURING AND QUANTIFYING AMOUNTS OF CARBON FROM CERTAIN GREENHOUSE GASES SEQUESTERED IN GRASSY AND HERBACEOUS PLANTS ABOVE AND BELOW THE SOIL SURFACE

[75] Inventors: John D. Caveny, Monticello, Ill.; William K. Crispin, South Miami, Fla.; Robert L. Conley, Lexington, Ky.

[73] Assignee: Enviromentally Correct Concepts, Inc., Monticello, Ill.

[21] Appl. No.: 956,216

[22] Filed: Oct. 22, 1997

Related U.S. Application Data

[60] Provisional application Nos. 60/051,701, Jul. 3, 1997 and 60/051,650, Jul. 3, 1997.

[51] Int. Cl.⁶ .......................... A01K 29/00; A01G 23/00
[52] U.S. Cl. ............................. 119/174; 47/58 C
[58] Field of Search .............................. 119/174; 47/58 C, 47/58 EM, 58 EC, 58 T; 135/420, 430

[56] References Cited

U.S. PATENT DOCUMENTS

| 5,471,785 | 12/1995 | Matthews | 119/174 |
|---|---|---|---|
| 5,474,085 | 12/1995 | Hurnik et al. | 119/174 |
| 5,482,008 | 1/1996 | Stafford et al. | 119/174 |
| 5,697,326 | 12/1997 | Mottram et al. | 119/174 |

*Primary Examiner*—Robert P. Swiatek
*Assistant Examiner*—Elizabeth Shaw
*Attorney, Agent, or Firm*—Banner & Witcoff, Ltd.

[57] ABSTRACT

Carbon sequestration of greenhouse gases ($CO_2$ and $CH_4$) is effected through enhancement of plant growth using defoliation techniques with and without grazing animals. Processes and devices for measurement of the verifiable quantity of carbon sequestered are disclosed.

6 Claims, 5 Drawing Sheets

| 1 | 221C2 - PARR |
| 2 | 171 B - CATLIN |
| 3 | 145 C2 - SAYBROOK |

| 4 | 74 - RADFORD |
| 5 | 56 B - DANA |
| 6 | 27 C2 - MIAMI |

SUMMER GRAZING CELL DESIGN

A WOODS
B PERMANENT FENCE
C SEMI-PERMANENT FENCE
D PERENNIAL STREAM
E TEMPORARY FENCE
F WATER LINE
G WATER POND

WINTER GRAZING CELL DESIGN

A WOODS

B PERMANENT FENCE

C SEMI-PERMANENT FENCE

D PERENNIAL STREAM

E TEMPORARY FENCE

F WATER LINE

G WATER POND

FORAGE MAP

1. ORCHARD GRASS & LEGUMES OVERSEEDED WITH SUMMER ANNUALS- SUMMER PASTURE
2. FESCUE & BLUEGRASS WINTER PASTURE
- A  WOODS
- D  PERENNIAL STREAM

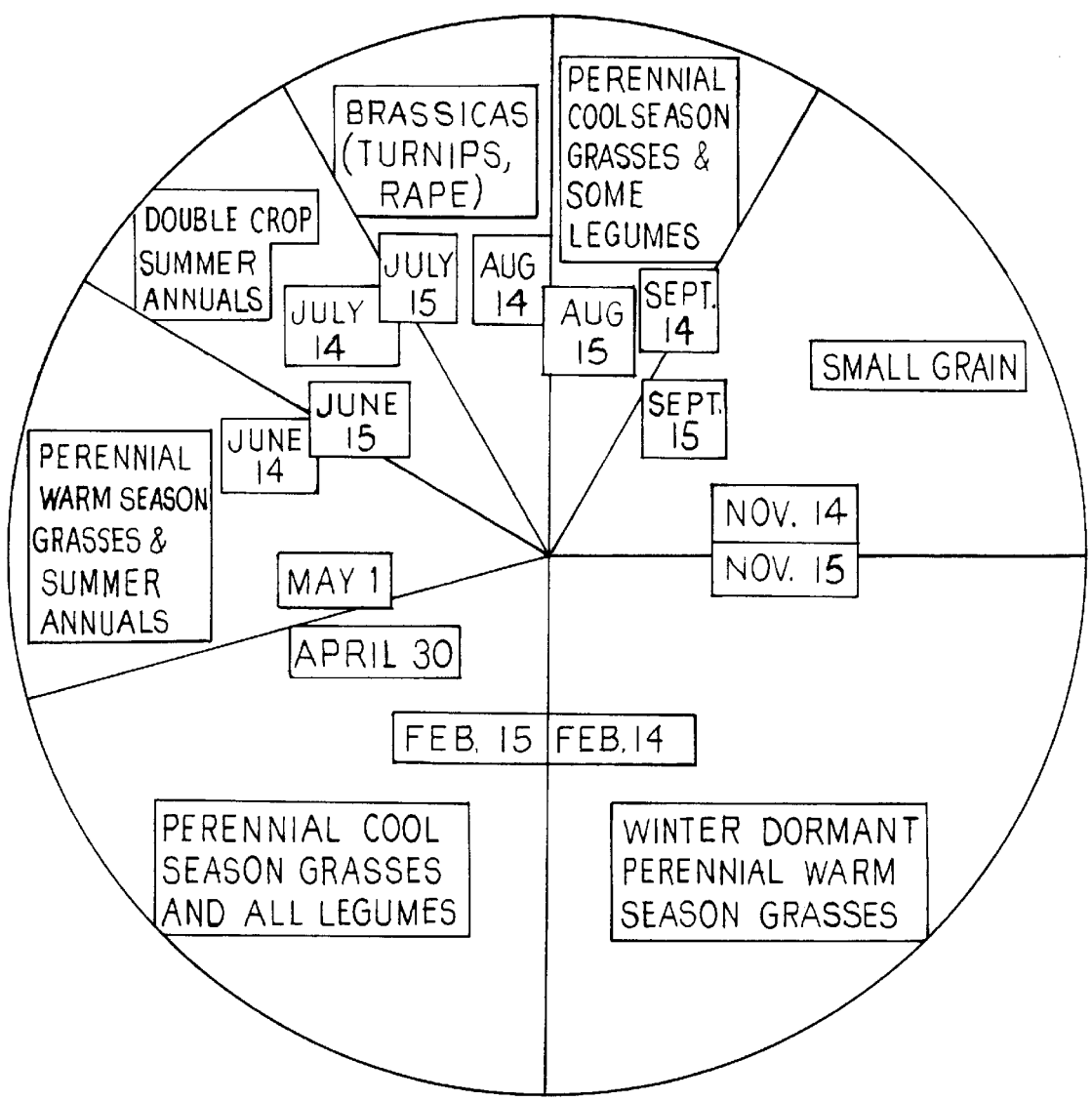

5,887,547

METHOD FOR MEASURING AND QUANTIFYING AMOUNTS OF CARBON FROM CERTAIN GREENHOUSE GASES SEQUESTERED IN GRASSY AND HERBACEOUS PLANTS ABOVE AND BELOW THE SOIL SURFACE

CROSS REFERENCE TO RELATED APPLICATIONS

This is an application under 35 USC Section 119(e) based upon previously filed provisional applications, Ser. No. 60/051,701 filed Jul. 3, 1997 and Ser. No. 60/051,650 filed Jul. 3, 1997, both of which are incorporated herewith by reference, both of which are copending, and both of which are believed to disclose adequately and sufficiently subject matter claimed herein.

BACKGROUND OF THE INVENTION

This invention relates to the apparatus and methods for quantifying the gases generated or sequestered by plant life and photosynthetic organisms.

Gases, such as carbon dioxide and methane, found in trace quantities in the atmosphere, absorb infrared energy and prevent such energy from leaving the atmosphere. Such gases are often referred to as "greenhouse" gases. Increasing levels of greenhouse gases in the atmosphere may therefore contribute to an increase in average global temperatures, resulting in adverse climate changes otherwise known as global warming. During the last century, human activities, such as burning fossil fuels, have increased the atmospheric levels of these so-called greenhouse gases.

Since 1800, atmospheric concentrations of $CO_2$ have increased by more than 25%, primarily from the combustion of fossil fuels. For example, the burning of coal, oil and other organic-based fuels accounts for 99% of total U.S. $CO_2$ emissions. In 1994, 1,529 million tons of carbon equivalent (MTCE) of $CO_2$ were emitted as a direct result of fossil and organic-based fuel combustion. The other 1% of $CO_2$ emissions is the by-product of non-energy related industrial practices. These include cement and lime production, limestone consumption, and soda ash production and use.

Over the last two centuries, the concentration of atmospheric methane has more than doubled. Although methane is second in quantity to $CO_2$ as a greenhouse gas, methane is 24.5 times more effective in trapping heat or energy over a 100 year period. In 1994, 205 MTCE of methane were emitted in the United States. The largest sources are municipal solid waste landfills, which account for 90–95% of total landfill emissions. Currently, about 15% of landfill methane is recovered for use as an energy source. Roughly one-third of 1994 methane emissions came from agricultural operations. Topping the list of sources are enteric fermentation in domestic livestock and manure management. Approximately 27% of 1994 U.S. methane emissions came from coal mining and petrol resources.

In response to these concerns and, pursuant to commitments made under the Framework Convention on Climate Change, the United States has undertaken efforts to reduce its greenhouse gas emissions. Rather than implementing a regulatory program, the Congress and President have called for voluntary action to reduce carbon emissions. The President's Climate Change Action Plan outlines a series of voluntary programs aimed at returning U.S. greenhouse gas emissions to 1990 levels by the year 2000 through reducing carbon emissions and through carbon sequestration projects.

When considering the protocol for controlling carbon emissions, one may refer to the market-based sulphur dioxide ($SO_2$) allowance trading component of the Acid Rain Program. The Acid Rain Program allows electric utilities to adopt the most cost-effective strategy to reduce $SO_2$ emissions at generating units in their system. The Acid Rain Program Operating Permit outlines the specific program requirements and compliance options chosen by each source. Affected utilities are also required to install systems that continuously monitor emissions of $SO_2$ and other pollutants in order to track progress, ensure compliance and provide credibility to the trading component of the program.

A parallel program to trade carbon credits may be patterned after the $SO_2$ Allowance Trading System. The Administration recently proposed as yet unspecified emissions budgets that could be banked or traded among developed nations in order to reduce the levels of greenhouse gas emissions. According to the "Draft Protocol Framework," a procedure to ensure adequate reporting, measurement, review and compliance would need to be established. It would provide for "joint implementation" through which countries without emission budgets could create and transfer emission reduction credits, commonly called carbon credits, by those that do. The source of such carbon credits could be green plants or other photosynthetic organisms.

Green plants have the ability to make and store their own energy. Using light energy from the sun, carbon from the air and water in the soil, green leaves make sugar in a reaction called photosynthesis. A green plant can either use this energy for immediate growth or store it as starch for future use. Plant growth, death and decay is a natural process which produces organic matter. Organic matter is concentrated in the top few inches of many soils because most of the plant residue falls to the soil surface. Root decay also makes an important contribution to soil organic matter formation deeper in the soil. Soil formed under prairies or other grasslands, where roots are dense and evenly distributed through the top several feet, have a high concentration of soil organic matter. By definition, such organic matter is highly carbonaceous and represents conversion of atmospheric $CO_2$.

Because air makes up only 25–30% of soil volume, there is little oxygen to oxidize the stored carbon from such organic matter and release it back into the atmosphere as carbon dioxide. This process of fixing and storing atmospheric carbon in a sink such as vegetation or soil is called carbon sequestration, and the problem facing scientists and engineers is how to properly quantify the process and enhance the process from a quantitative viewpoint.

To promote active growth, and thus the photosynthesis process, a forage plant must continually undergo a level of partial defoliation during its growing season which does not restrict root growth and which encourages leaf growth. Plants cannot photosynthesize optimally unless they have green leafy material above the ground to absorb sunlight. Cutting and removing older plant growth stimulates growth which allows for increased, more photosynthetically efficient new growth and contributes to greater sequestration of carbon.

It has been recognized since the mid-1950s that partial defoliation of grassy and herbaceous plants stimulates the root system to grow optimally and encourages the growth of new green leafy plant material. The importance of this in the process of fixing carbon above and below the soil in plant tissue is that when the plant is growing vigorously, the plant removes more airborne carbon (i.e. carbon dioxide) and converts it to sugars and starches during the process of photosynthesis. Increased root mass and leaf surface, which is not shaded by mature, inefficient photosynthesizing plant material, allows the plant to photosynthesize more efficiently and to persist and grow during periods of environmental stress. Further, vigorously growing plants begin growing earlier during their growing season and continue growing later in the growing season thereby causing the plant to extract more carbon from the air and fix more carbon in above-ground and below-ground plant tissue, i.e. leaves, stems and roots. Partial defoliation of the plant to achieve optimal plant growth resulting in maximum carbon sequestration can be thus accomplished through the cutting, collecting and measurement of grassy and herbaceous crops on a predetermined schedule, providing for a prescribed level of defoliation.

A problem, therefore, relates to the development of methods and apparatus to promote green plant growth efficiently and to measure, quantitatively, the growth in standard, universally accepted units.

SUMMARY OF THE INVENTION

Briefly, the present invention comprises various methods, apparatus and techniques for measuring the amount of carbon sequestered by photosynthetic organisms such as green leafy plants. More particularly, by utilizing various assay methods, the quantitative amount of carbon sequestration in a given geographic area over a fixed time is determined taking into account process release of greenhouse gases as well as quantitative capture of carbon containing compounds such as methane ($CH_4$) and carbon dioxide ($CO_2$).

Thus, we have discovered an important consequence of cutting and storing grassy and herbaceous crops by providing a method to weigh or otherwise measure growing and harvested plant material, after being corrected for moisture, for the purposes of determining amounts of $CO_2$ removed from the air. The method ensures adequate measurement of the amounts of carbon dioxide removed from the air and a reporting system which documents those amounts removed from the air. Because a living plant removes carbon dioxide from the air and the anthropogenic activities necessary for culturing the living plant release carbon dioxide back into the atmosphere, the reporting system calculates net carbon sequestered. The difference between carbon dioxide released and carbon dioxide removed is then used to calculate the amount of carbon sequestered by the living plant in both those portions of the plant above and below the ground.

Thus it is an object of the invention to provide a method and apparatus for carbon sequestration.

A further object of the invention is to provide a method and apparatus for enhancement of quantitative carbon sequestration.

Another object of the invention is to provide apparatus and methods for credibly measuring the quantity of carbon removed from the atmosphere by sequestration methods.

Another object of the invention is to provide a method and apparatus that uniformly and fairly certify the measurements of carbon sequestration.

These and other objects, advantages and features of the invention will be set forth in the detailed description which follows.

BRIEF DESCRIPTION OF THE DRAWING

In the detailed description which follows, reference is to be made to the drawing comprised of the following figures:

FIG. 5 is a seeding schedule.

DESCRIPTION OF THE PREFERRED EMBODIMENTS

Figure 1:
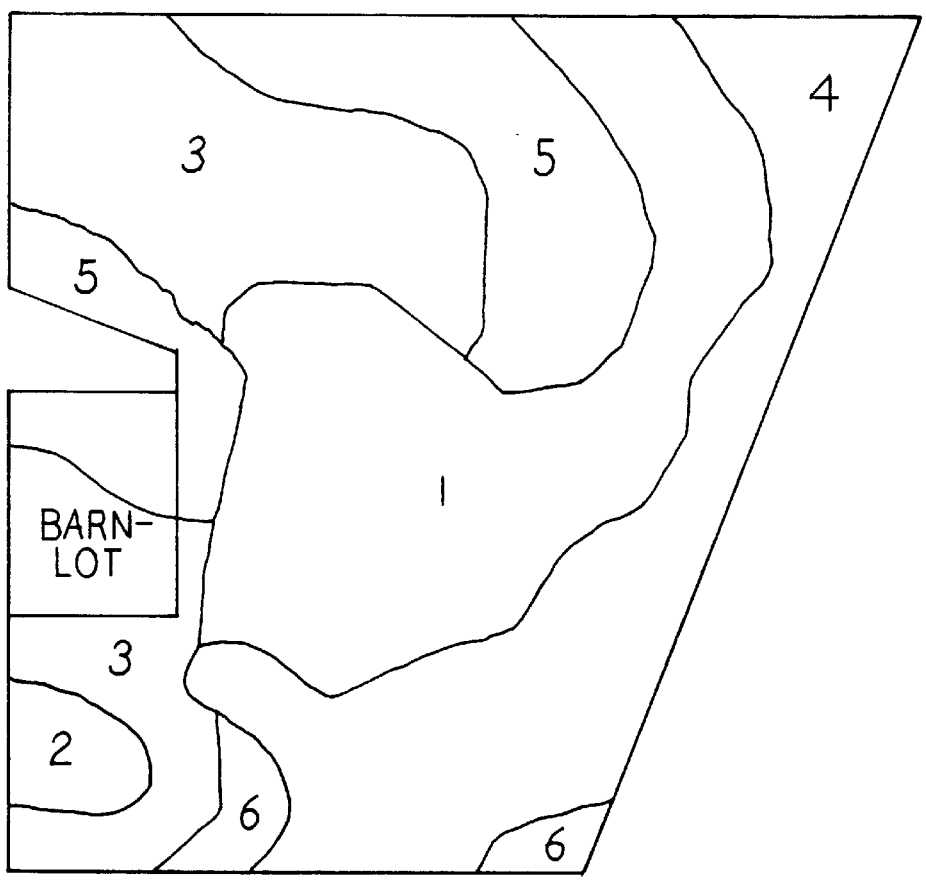
FIG. 1 is an example of a soil map of a geographical area using the invention.

One embodiment of the method contemplates selectively cutting, collecting and measuring grassy and herbaceous crops on a predetermined schedule and provides for a prescribed level and technique of defoliation other than simple mowing. The method further provides a means for harvesting plant material and weighing or otherwise quantifying that material after it is corrected for moisture content for the purpose of determining the amount of carbon dioxide removed from the atmosphere within a certain geographic region.

Mowing or shredding, as a method of mechanical defoliation, only adjusts plant height. It detaches the upper portion of the plant and deposits that detached plant material unevenly on the stover or stubble in wheel tracks in a form that is difficult or impossible to accurately collect. Additionally, the detached portion of the plant shades the remaining portion of the growing plant. Understory plants are often suppressed, thereby reducing overall photosynthetic activity. More importantly, there is very little, if any, net carbon sequestration from mowing because the detached plant material oxidizes and releases carbon dioxide back into the air and because the process of mowing usually involves the use of an internal combustion engine which uses a petroleum distillate as an energy source. For example, the combustion of gasoline releases approximately 19–20 lbs. of carbon into the air per gallon of gasoline combusted; the same is true for diesel fuel with approximately 20–26 lbs. of carbon being released per gallon of diesel use. Simply mowing the living plants potentially can release more carbon dioxide into the air than the growing, living plant can remove from the air.

The present method contemplates controlled defoliation. Thus as a first step, the geographic region of controlled defoliation is established by metes and bounds. The herbaceous plants and photosynthetic materials within that region are then inventoried and the other relevant characteristics of the tract are also inventoried. For example, the type of soil, climatic conditions, length of growing season, rainfall, etc. are inventory information that relate to the specific tract in combination with the identification and classification of the plant material.

Typically, the method utilizes differentially corrected global positioning satellite (DGPS) technology to establish coordinates and measurements specific to a tract of land. These readily identifiable points fix the location of tracts and fix surface area amounts within the tract. Even quantitative data regarding crop condition on the tract may be determined. Surveys may also be used but are no longer necessary to generally establish perimeter boundaries. Subdivisions within the tract, necessary for optimal grassy and herbaceous plant production, can be calculated using this technology (DGPS) from remote locations using companion geographic information systems (GIS) technology. Integrated DGPS-GIS technology and satellite generated imagery are used to create base maps of growing and grazing areas (where relevant), to create a schedule for monitoring and measuring plant growth, and to coordinate mechanical or other defoliation of the growing plants. Processed satellite generated images of a growing and grazing area may be used to develop data sets which measure vegetative vigor.

Next, the plant material is detached at or near ground level using sickle bar cutters, rotary mowers, flail cutters, or other acceptable means. The harvest is then collected by baling or other means, is weighed or otherwise measured so as to calculate the effective carbon content therefrom. Various specific species of plants are encouraged in their growth pattern and harvested. For example, eucalyptus trees, avocado trees and similar types of plants are known to regrow from a specific existing root system once the plant is cut. Thus, the photosynthetic process can be enhanced by cutting and removing the material to the stump and collecting the material while the plant then regrows from the stump.

Cloning of the particular herbaceous material to promote rapid growth characteristics and the bushiness of the plant (i.e., the square meters of leaf surface exposed to the sun) are also possible. The plants can then be processed in a manner by which the plant material can be combined with bacteria so that the carbon content of the plant will serve to enhance the new growth.

As another or alternative embodiment of the invention, in place of mechanical defoliation followed by analysis of the resultant photosynthetic growth, animal husbandry may be utilized in a method for quantitative analysis of photosynthetic growth. Thus, another important use of grazing animals is that of being used as a device to harvest forage plant material for the purpose of determining sequestered carbon. Partial defoliation of the plant to achieve optimal plant growth resulting in maximum carbon sequestration is accomplished through the manipulation and management of multiple species of grazing animals and further by classes of animals within a species to achieve a predetermined, prescribed level of defoliation. Predictions of animal growth, lactation or general body condition can be made and verified through the use of readily available devices such as scales, or more sophisticated devices such as ultrasound or magnetic resonance imaging machines.

The method, for example, uses electronically identified grazing animals as devices to harvest forage plant material from site-specific areas. These animals have the ability to convert forage plants to weight gain or milk, for example. Observed changes in animal weight and appearance and measurable products, such as milk, are used to calculate the amount of plant material the animal ingested. From known amounts of ingested plant material from specific tracts of land, one can calculate total carbon sequestered by plant growth using Department of Energy or other formulas.

Again, the method begins by using differentially corrected global positioning satellite (DGPS) technology to establish coordinates specific to a tract of land. These readily and repeatedly identifiable points fix the location of grazing tracts and fix surface area amounts within the tract. Subdivisions within the tract, necessary for optimal grazing, can be calculated using this technology from remote locations using companion geographic information systems (GIS) technology. Integrated DGPS and GIS technology is used to create a schedule for controlled grazing and for monitoring it thereafter. The same integrated DGPS and GIS technology in combination with modular software can also track animal movement in dense cover (canyons, forest and brush) from remote locations. This allows the grazing manager to monitor and verify that certain specific animals grazed certain specific areas at certain specific times.

Grazing animals graze selectively. This phenomenon allows for a range of near total defoliation of certain plants, within an identified area, to almost negligible defoliation of certain plants in the same area. This is distinctly different from the action of a chemical or mixtures of chemical defoliants, that are selective for certain plants. The chemical mode of action which targets specific plants often destroys the plant. Destruction may not be appropriate in situations when only suppression is desired. The dead plant material shades the non-targeted plants and reduces their ability to photosynthesize optimally. In addition, many chemical herbicides are petroleum-based and carry use restrictions that may not make them appropriate choices for defoliants in sensitive watershed areas or other critical lands.

In review, the amounts of carbon sequestered by plant tissue above and below the soil surface is determined through the performance of a series of steps. First, there is established a boundary of a tract of land for which the quantification is to be defined. The boundaries may be established using satellite technology as previously referenced or normal surveying technology. Next, there is introduced into the region various grazing animals in a defined number and a defined species or mixture of species. The animals introduced into the region are identified by any of various means including branding or tattooing. They also may be, and typically are, equipped with a signal generating device which has a recordation of the various attributes of the animal at the beginning or set time zero of the measuring period and preferably includes means for measuring changes in the original setting of attributes. For example, the species' age, weight, body condition, body percentage attributable to fat and other physical characteristics of the animal are initially recorded and continuously updated. The animals are then maintained in the measured tract for a specific period of time. Simultaneously, a data base relating to the foliage in the area is compiled.

During a set time period, the grazing animals will partially defoliate the foliage in the tract. After a given period of time, the condition and the height of the foliage is again measured and there is calculated therefrom, and from the animals' changing condition, an amount of foliage consumed by the animals. This number is then converted into a calculation of the enhanced growth rate of the foliage in the geographical tract. This enhanced growth pattern will provide an indication of the amount of carbon compounds carried by the plants through the photosynthesis process. Factored into this calculation will be the enteric release of gases by the grazing animals as well as any internal combustion type uses in order to control the animals during the grazing period so that a net calculation of carbon credits can be ascertained. Those carbon credits will then be certified through an appropriate standardization and necessary governmental authority after which the credits may be traded through a mercantile exchange of one nature or another. A typical purchaser of such credits may well be a coal company or a power generating company.

Following are examples of the method of the invention and a discussion of apparatus for practicing the method. As a first step in an effort to sequester greenhouse gases, one may inventory the geographic area involved, for example. Consider the following with respect to the continental United States:

CHART I
CARBON SEQUESTRATION CALCULATIONS
Breakdown of United States Land Base

| | |
|---|---:|
| Private Land | 1375 million acres |
| Public Land | |
| State and Local | 108 million acres |
| Federal | 408 million acres |
| Rural Land | 1391 million acres |
| Cropland | 382 million acres |
| CRP | 36 million acres |
| Pasture | 125 million acres |
| Range | 399 million acres |

CHART I
CARBON SEQUESTRATION CALCULATIONS
Breakdown of United States Land Base

| | |
|---|---|
| Forest | 395 million acres |
| Miscellaneous | 55 million acres |
| Lands available for grassy and herbaceous crops | 942 million acres |

Utilizing these calculations as a basis for identification of candidate regions for the growth of various plants, one can calculate the amount of sequestered carbon associated with such regions as in Chart II:

CHART II
CARBON SEQUESTRATION CALCULATIONS
ON PERMACULTURE
(CRP Pasture and Rangeland)

| | | |
|---|---|---|
| Crested Wheat Grass | 12" mean annual precipitation (map) Pacific Northwest & Great Basin States | |
| Annual Production | 3000 lbs. hay per acre 6500 lbs. roots per acre | |
| Carbon Equivalent | 3000 lbs. × 45% = | 1350 |
| | 6500 lbs. × 59% = | 3835 |
| Total Carbon Sequestered = | | 5185 lbs. |
| Carbon Credits (OTC's Market Value): | $50 per ton = $.025/lb. $10 per ton = $.005/lb. | |
| Earnings Potential: | | |

5185 lbs. × $.025/lb. = $129.62 per acre
5185 lbs. × $.005/lb. = $25.92 per acre × 399 million acres = $10,342,080,000

| | | |
|---|---|---|
| Smooth Brome Grass | 30–40" map Great Lakes States; Upper South | |
| Annual Production | 7000 lbs. hay per acre 7740 lbs. roots per acre | |
| Carbon Equivalent | 7000 lbs. × 45% = | 3150 |
| | 7740 lbs. × 59% = | 4566 |
| Total Carbon Sequestered = | | 7716 lbs. |
| Earnings Potential: | | |

7716 lbs. × $.025/lb. = $192.90 per acre
7716 lbs. × $.005/lb. = $38.58 per acre × 125 million acres = $4,822,500,000

| | |
|---|---|
| Annual Crops (e.g. corn) | Carbon flows need to be considered |
| Annual Production | 120 bu. Grain per acre = 6720 lbs. per acre Shucks, cobs, leaves, stems = 6000 lbs. per acre Roots = 12000 lbs. per acre |
| Carbon equivalent | 6720 lbs. × 45% = 3024 6000 lbs. × 45% = 2700 12000 lbs. × 59% = 12804 |
| Earnings Potential: | |

12804 × $.005/lb = $64.02 per acre × 80 million acres = $5,121,600,000

With regard to Chart II, the following is noted: CRP means Conservation Reserve Program. Carbon equivalent is calculated as a percentage of the weight based upon dry matter weights of above ground and below ground plant material. In general terms, the composition of a typical plant on a dry matter basis is 45% carbon in the above ground portion of the plant and 55% carbon in the below ground portion of the plant. (Adapted from Barden, Halfacre, and Parrish 1987).

A further example is set forth in Chart III relating to hay land and hay plants.

CHART III
CARBON SEQUESTRATION CALCULATIONS ON HAYLAND
40 Acre Hayfield 90% Alfalfa 10% Orchardgrass Yield:

| | |
|---|---|
| 1st cutting | 3 tons/acre |
| 2nd cutting | 18 tons/acre |
| 3rd cutting | 1.2 tons/acre |

Total Air Dry (90% dry matter) Production = 6 tons/acre
Total Dry Matter = .9 × 6 = 5.4 tons/acre
Alfalfa Dry Matter = 90% × 5.4 = 4.86 tons/acre
Grass Dry Matter = 10% × 5.4 = .54 tons/acre
Carbon Credit Calculations:
Alfalfa (Assume roots equal 3 times above ground growth):

| | |
|---|---|
| Above Ground  45% × 4.86 tons/acre = | 2.187 tons carbon/acre |
| Below Ground  59% × 4.86 tons/acre × 3 = | 8.602 tons carbon/acre |

Grass (Assume roots equal 1.1 times above ground growth):

| | |
|---|---|
| Above Ground  45% × .54 tons/acre = | .243 tons carbon/acre |
| Below Ground  59% × .54 tons/acre ×1.1 = | .350 tons carbon/acre |
| TOTAL CARBON SEQUESTERED = | 11.382 tons carbon/acre |

Earnings Potential:

Carbon @ $10.00/ton × 11.382 tons = $113.82/acre × 40 acres = $4,552.80
Carbon @ $50.00/ton × 11.382 tons = $569.10/acre × 40 acres = $22,764.00

NOTE: Because haying requires mechanical equipment, the fuel spent producing hay tonnages must be deducted from the total amounts of carbon sequestered.

Revenue to pay for the carbon credits and thus create an incentive to establish greenhouse gas sequestration may be generated by a surcharge on fuels in accord with Chart IV.

CHART IV
CARBON CREDIT BUNDLING WITH FUEL

| | |
|---|---|
| Assume: | Gasoline emits 19 lbs. of $CO_2$ per gallon combusted Diesel emits 26 lbs. of $CO_2$ per gallon combusted Carbon credits @ $10/ton or $.005/lb. |
| If you bundle carbon credits with the sale of gasoline: | 19 lbs. × $.005/lb. = $.089 gallon |
| If you bundle carbon credits with the sale of diesel | 26 lbs. × $.005/lb. = $.13/gallon |
| If you bundle carbon credits with 1 bu. Corn (ethanol): | 56 lbs. × 45% = 25.2 lbs. carbon/bu. × $.005/lb. = $.126/bu. |

Thus the extra revenues associated with or taxed onto fuel sales will be used to pay the creators of the greenhouse gas collection plots or regions exemplified by Charts I, II and III and a market or exchange system can be adopted to facilitate the transactions.

As detailed herein, there are multiple ways to develop so-called carbon credits. One way is to merely plant, grow, defoliate and collect various grasses and green plants as described. Such plants may or may not be harvested or trimmed in whole or part. In another method to effect carbon sequestration, animals may be used to accentuate crop growth and to enhance the return on investment in the grasses or crops by virtue of growing the animals for market. By analyzing animal growth, a certifiable carbon credit value may be obtained. Following is an example of such an animal husbandry method:

Cattle Husbandry

A central Illinois farm consists of all highly erodible soil types in permanent perennial vegetation with certain areas overseeded to summer annuals. The objective is to produce approximately 500 lbs. of beef per acre in two grazing cycles—one starting around April 1 and the other starting around September 15. A customer base will buy calves directly from the farm. An alternative marketing program is to market the cattle through Illinois livestock auctions.

Production Costs

A projected budget for the Fall 1997 grazing season is illustrated below.

BUDGET—FALL 1997
Returns from cattle on 30 acres 6640 animal days

|  | Total $ | $ Per Acre |
|---|---|---|
| VARIABLE COSTS: | | |
| Outbound Ave. Wt. (Feb. 28, 1998) 40 head 674 @ .77 | $20,759 | $691.97 |
| Inbound Ave. Wt. (Sept. 15, 1997) 40 head 425 @ .82 | $13,940 | $464.66 |
| Value of gain = $\frac{\$691.97 - \$464.66}{249 \text{ lbs.}}$ = \$0.912 | | |
| OTHER VARIABLE COSTS: | | |
| Mineral & Salt (1.6 oz./head/day) | $1195.20 | $39.84 |
| Fish meal (6 oz./head/day) | 996.00 | 33.20 |
| Vet Med | 45.00 | 1.50 |
| Hauling & Commissions | 300.00 | 10.00 |
| Fertilizer | 600.00 | 20.00 |
| Death loss 1% | | 4.64 |
| Interest (15000 @ 10%) | 750.00 | 25.00 |
| Total Other Variable Costs | | $134.18 |
| Total Other Variable Cost of gain = 134.18/ 249 lbs. = $0.538/lb | | |
| Total Variable Costs: $134.18 + $464.66 = | | $598.84 |

Soil on such a farm does not lend itself to cash crop production. FIG. 1 illustrates the soil makeup of the test plot.

Figure 2:
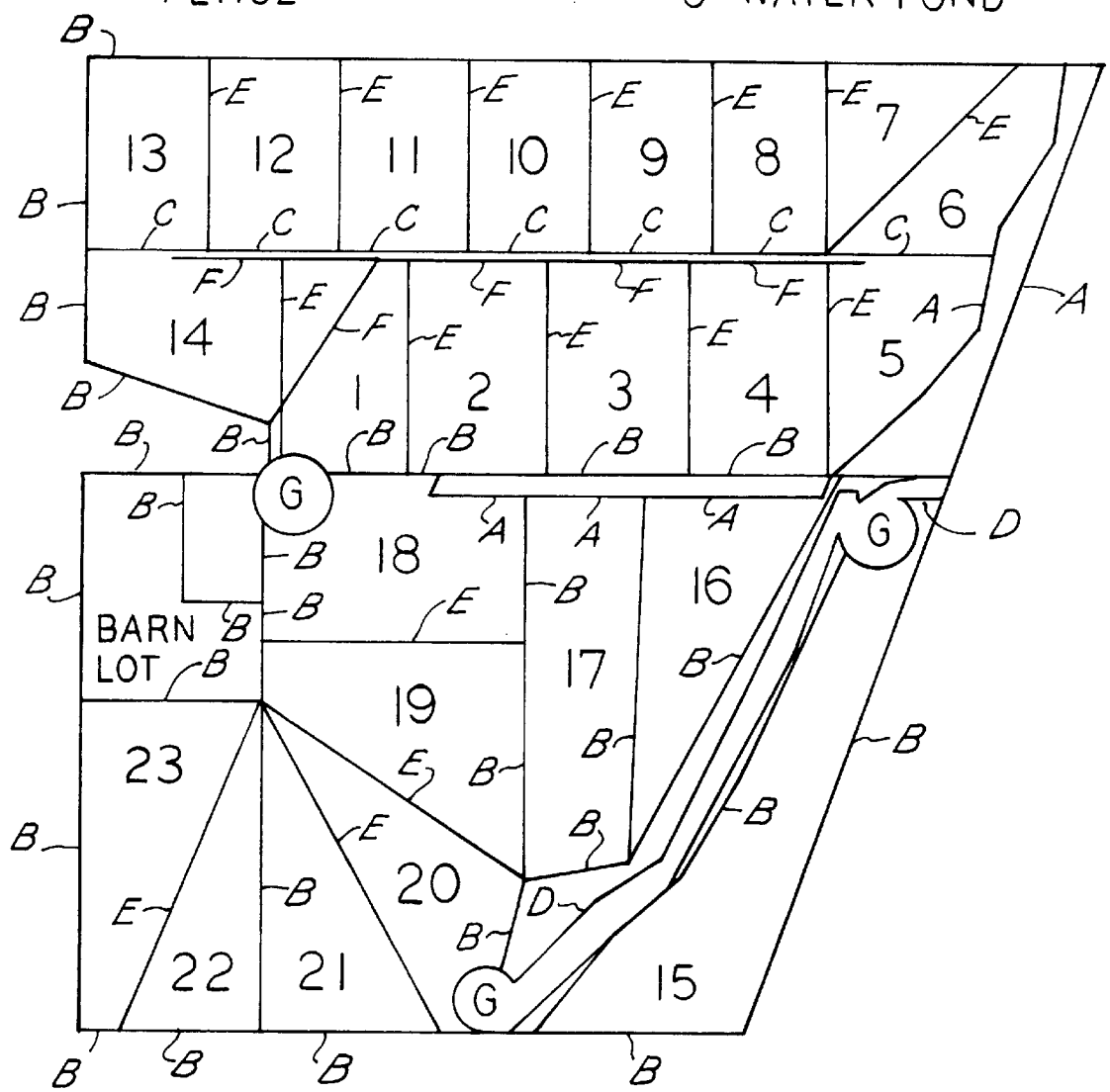
FIG. 2 is a subplot map of FIG. 1.
Figure 3:
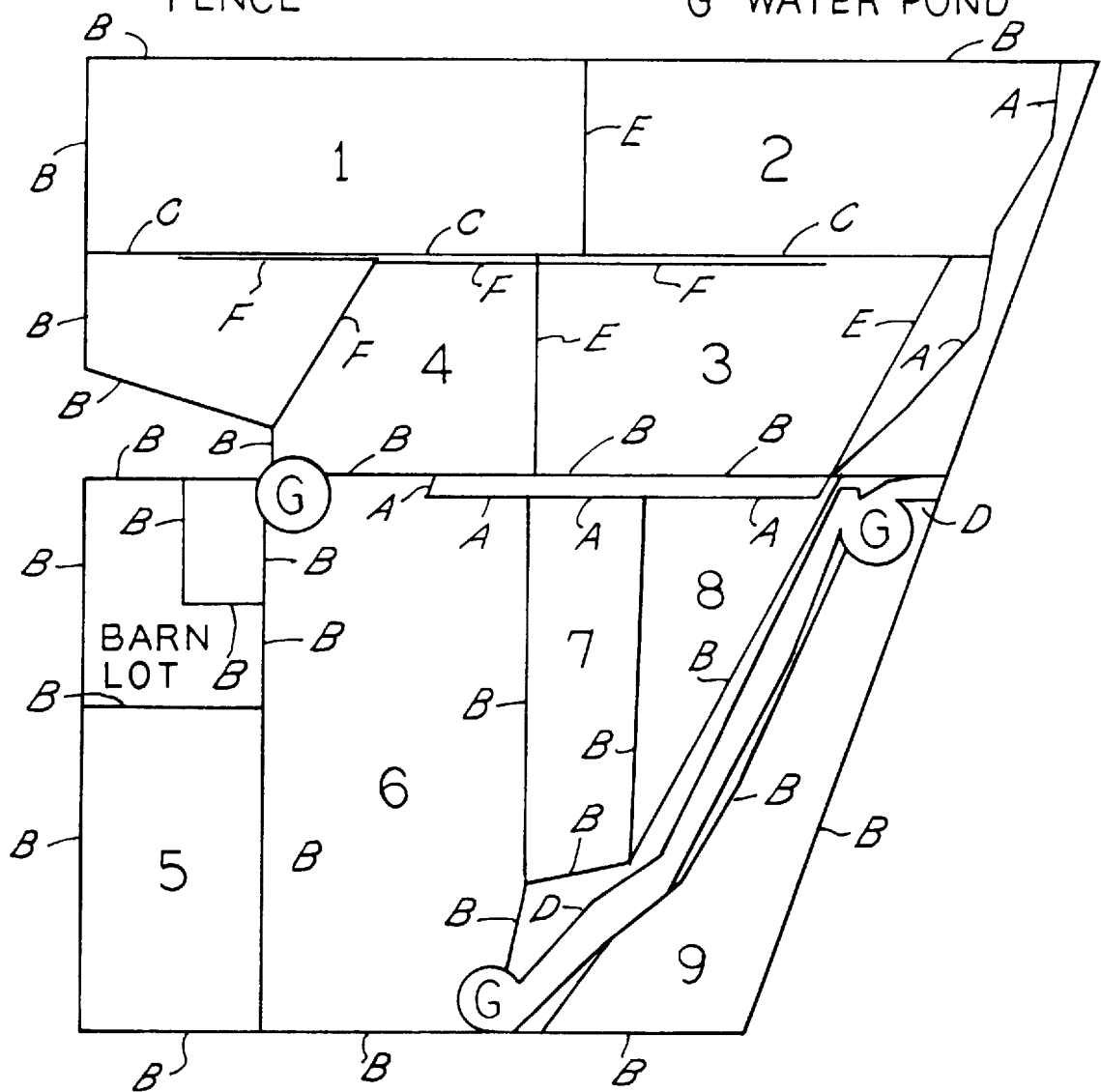
FIG. 3 is another subplot map of FIG. 1.
Figure 4:
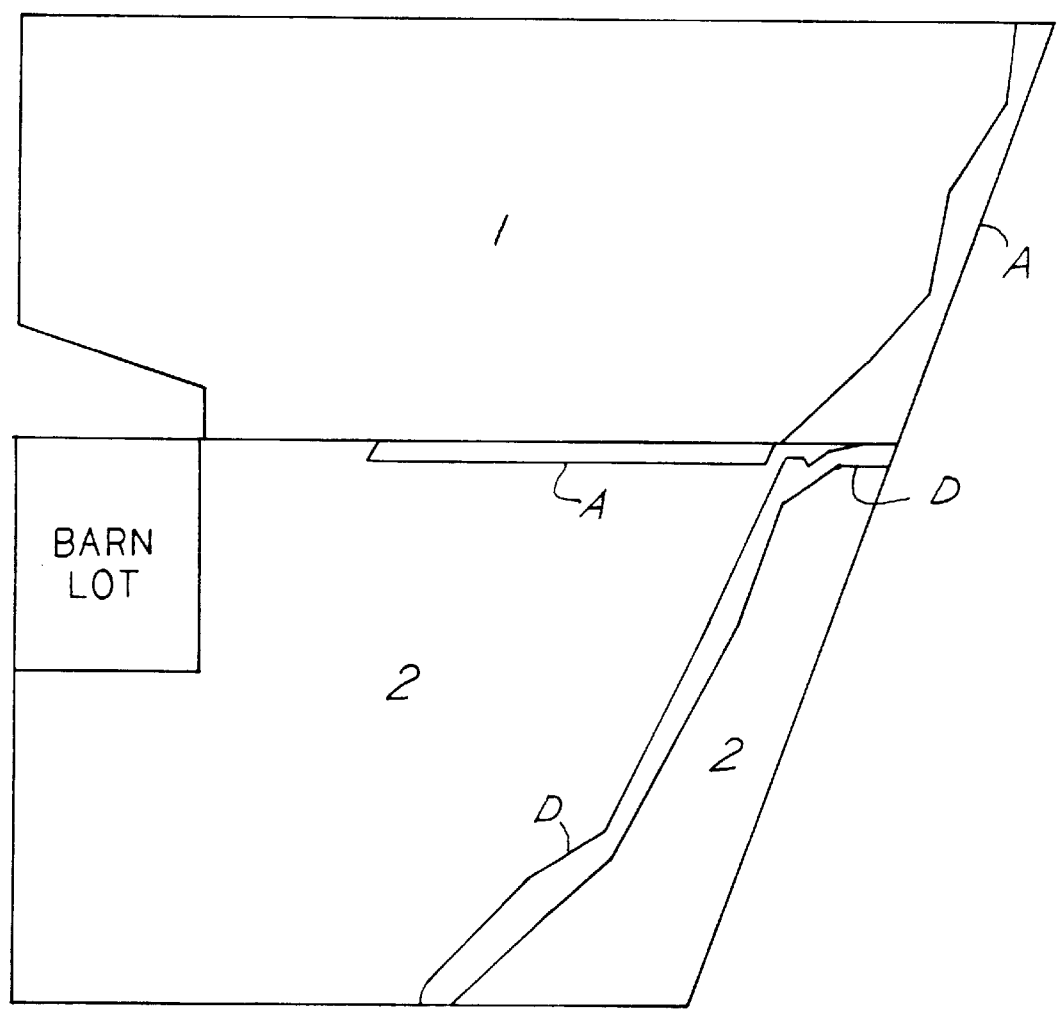
FIG. 4 is a chart of grass plantings.

To maximize grass and plant growth, the land is divided into cells or subplots for summer grazing (FIG. 2) and winter grazing (FIG. 3). Grasses are planted on the plots as shown in FIG. 4. Chart V correlates the cell or subplot areas with grasses:

CHART V
FORAGE DATABASE

| SUMMER CELL# | CELL AREA | TYPE OF GRASS | SOIL TYPE | PROD. INDEX |
|---|---|---|---|---|
| 1 | 1.16 Acres | Orchardgrass/Legumes | 145C2-Saybrook; | 132 |
|  |  |  | 56B-Dana; | 139 |
|  |  |  | 221C2-Parr | 122 |
| 2 | 1.22 Acres | Orchardgrass/Legumes | 145C2-Saybrook; | 132 |
|  |  |  | 221C2-Parr | 122 |
|  |  |  | 145C2-Saybrook; | 132 |
| 3 | 1.33 Acres | Orchardgrass/Legumes | 56B-Dana; | 139 |
|  |  |  | 221C2-Parr | 122 |
| 4 | 1.26 Acres | Orchardgrass/Legumes | 56B-Dana | 139 |
|  |  |  | 221C2-Parr | 122 |
| 5 | 1.52 Acres | Orchardgrass/Legumes | 74-Radford | 140 |
|  |  |  | 221C2-Parr | 122 |
| 6 | 1.24 Acres | Orchardgrass/Legumes | 74-Radford | 140 |
|  |  |  | 221C2-Parr | 122 |
| 7 | .84 Acres | Orchardgrass/Legumes | 74-Radford | 140 |
|  |  |  | 221C2-Parr | 122 |
| 8 | .94 Acres | Orchardgrass/Legumes | 56B-Dana | 139 |
|  |  |  | 221C2-Parr | 122 |
| 9 | 1.03 Acres | Orchardgrass/Legumes | 145C2-Saybrook | 132 |
|  |  |  | 56B-Dana | 139 |
| 10 | 1.00 Acres | Orchardgrass/Legumes | 145C2-Saybrook | 132 |
|  |  |  | 56B-Dana | 139 |
| 11 | 1.08 Acres | Orchardgrass/Legumes | 145C2-Saybrook | 132 |
|  |  |  | 56B-Dana | 139 |
| 12 | 1.09 Acres | Orchardgrass/Legumes | 145C2-Saybrook | 132 |
| 13 | .96 Acres | Orchardgrass/Legumes | 145C2-Saybrook | 132 |
| 14 | 1.26 Acres | Orchardgrass/Legumes | 56B-Dana | 139 |
|  |  |  | 145C2-Saybrook | 132 |
| 15 | 2.49 Acres | Fescue/Bluegrass | 74-Radford | 140 |
|  |  |  | 27C2-Miami | 113 |
| 16 | 1.62 Acres | Fescue/Bluegrass | 221C2-Parr | 122 |
|  |  |  | 74-Radford | 140 |
| 17 | 1.83 Acres | Fescue/Bluegrass | 221C2-Parr | 122 |
|  |  |  | 74-Radford | 140 |
| 18 | 1.83 Acres | Fescue/Bluegrass | 56B-Dana | 139 |
|  |  |  | 145C2-Saybrook | 132 |
|  |  |  | 221C2-Parr | 122 |
| 19 | 1.60 Acres | Fescue/Bluegrass | 145C2-Saybrook | 132 |
|  |  |  | 221C2-Parr | 122 |
|  |  |  | 74-Radford | 140 |
| 20 | 1.29 Acres | Fescue/Bluegrass | 74-Radford | 140 |
|  |  |  | 27C2-Miami | 113 |
|  |  |  | 145C2-Saybrook | 132 |
| 21 | 1.17 Acres | Fescue/Bluegrass | 145C2-Saybrook | 132 |
|  |  |  | 27C2-Miami | 113 |
|  |  |  | 171B-Catlin | 144 |
| 22 | .88 Acres | Fescue/Bluegrass | 145C2-Saybrook | 132 |
|  |  |  | 171B-Catlin | 144 |
| 23 | 1.49 Acres | Fescue/Bluegrass | 145C2-Saybrook | 132 |
|  |  |  | 171B-Catlin | 144 |

Seeding is effected in accord with a schedule reported by FIG. 5. November through March is a dormant season. Grasses grow during the remainder of the year. Two groups of the calves are fed off of the grasses moving from cell to cell in a summer season (April-August) for one group and a second or winter group moving from winter cell to cell during September through March. Movement from cell to cell (subplot or paddock) is effected on a 1–3 day cycle or as described in a specific, controlled defoliation schedule, i.e. grazing plan, specific to a grazing area or areas identified using DGPS-GIS technology or other land surveying protocols. Each movement is accompanied by data collection including cattle weight and grass height.

Chart VI is a calculation of carbon credits generated from the process.

CHART VI
CARBON CREDIT CALCULATION ON 30 ACRES
From Fall 1997 Budget

| | |
|---|---|
| Total Outbound Weight | 26,960 lbs. |
| Total Inbound Weight | 17,000 lbs. |
| Total Gain | 9,960 lbs. |
| Gain per Acre (9960 / 30 Ac) | 332 lbs. |
| Grass Conversion Efficiency from Literature | 8.5 lbs. grass (dry matter) = 1 lb. animal gain |
| Total Lbs. of Gain converted to Grass | 9960 lbs. gain × 8.5 lbs. = 84,660 lbs. grass |
| Literature Value: % Carbon in Grass Herbage = 45% | |
| Total Lbs. of Carbon Sequestered from Grass | 45% × 84,660 lbs. grass = 38,097 lbs. carbon |
| Ratio of Root Growth to Top | 1.1:1 |

CHART VI
CARBON CREDIT CALCULATION ON 30 ACRES
From Fall 1997 Budget

| | |
|---|---|
| Growth in Orchardgrass (from Literature) | |
| Total Lbs. of Root Growth | 84660 lbs. grass × 1.1 = 93126 lbs. of roots |
| Literature Value: % Carbon in Grass Roots = 55% | |
| Total Lbs. of Carbon Sequestered in Roots | 55% × 93126 lbs. roots = 51,219 lbs. carbon |
| Total Lbs. of Carbon in Herbage & Root Growth | 38,097 lbs. (herbage) + 51,219 lbs. (roots) = 83,316 lbs. or 44.658 tons |
| Tons of Carbon per Acre | 44.658 tons / 30 acres = 1.4886 tons per acre of carbon sequestered |

Chart VII illustrates the correlation between plant consumption and animal weight. Data of this type is then used in accord with Chart VI to calculate carbon credits.

CHART VII
CHART SHOWING RELATIONSHIP BETWEEN BODY WEIGHT AND DRY MATTER CONSUMPTION PER HEAD PER DAY

| Week | Weight @ 1.5 lbs./day | Dry Matter/ Head/Day | Weight @ 1.8 lbs./day | Dry Matter/ Head/Day | Weight @ 2.0 lbs./day | Dry Matter/ Head/Day | Weight @ 2.2 lbs./day | Dry Matter Head/Day | Weight @ 2.4 lbs./day | Dry Matter/ Head/Day |
|---|---|---|---|---|---|---|---|---|---|---|
| 1 | 300.0 | 9.00 | 300.0 | 9.00 | 300.0 | 9.00 | 300.0 | 9.00 | 300.0 | 9.00 |
| 2 | 310.5 | 9.32 | 312.6 | 9.37 | 314.0 | 9.42 | 315.4 | 9.46 | 316.8 | 9.50 |
| 3 | 321.0 | 9.63 | 325.2 | 9.75 | 328.0 | 9.84 | 330.8 | 9.92 | 333.6 | 10.00 |
| 4 | 331.5 | 9.95 | 337.8 | 10.13 | 342.0 | 10.26 | 346.2 | 10.38 | 350.4 | 10.51 |
| 5 | 342.0 | 10.26 | 350.4 | 10.51 | 356.0 | 10.68 | 361.6 | 10.84 | 367.2 | 11.01 |
| 6 | 352.5 | 10.58 | 363.0 | 10.89 | 370.0 | 11.10 | 377.0 | 11.31 | 384.0 | 11.52 |
| 7 | 363.0 | 10.89 | 375.6 | 11.26 | 384.0 | 11.52 | 392.4 | 11.77 | 400.8 | 12.02 |
| 8 | 373.5 | 11.20 | 388.2 | 11.64 | 398.0 | 11.94 | 407.8 | 12.23 | 417.6 | 12.52 |
| 9 | 384.0 | 11.52 | 400.8 | 12.02 | 412.0 | 12.36 | 423.2 | 12.69 | 434.4 | 13.03 |
| 10 | 394.5 | 11.83 | 413.4 | 12.40 | 426.0 | 12.78 | 438.6 | 13.15 | 451.2 | 13.53 |
| 11 | 405.0 | 12.15 | 426.0 | 12.78 | 440.0 | 13.20 | 454.0 | 13.62 | 468.0 | 14.04 |
| 12 | 415.5 | 12.46 | 438.6 | 13.15 | 454.0 | 13.62 | 469.4 | 14.08 | 484.8 | 14.54 |
| 13 | 426.0 | 12.78 | 451.2 | 13.53 | 468.0 | 14.04 | 484.8 | 14.54 | 501.6 | 15.04 |
| 14 | 436.5 | 13.09 | 463.8 | 13.91 | 482.0 | 14.46 | 500.2 | 15.00 | 518.4 | 15.55 |
| 15 | 447.0 | 13.41 | 476.4 | 14.29 | 496.0 | 14.88 | 515.6 | 15.46 | 535.2 | 15.96 |
| 16 | 457.5 | 13.72 | 489.0 | 14.67 | 510.0 | 15.30 | 531.0 | 15.93 | 552.0 | 16.56 |
| 17 | 468.0 | 14.04 | 501.6 | 15.04 | 524.0 | 15.72 | 546.4 | 16.39 | 568.8 | 17.06 |
| 18 | 478.5 | 14.35 | 514.2 | 15.42 | 538.0 | 16.14 | 561.8 | 16.84 | 585.6 | 17.56 |
| 19 | 489.0 | 14.67 | 526.8 | 15.80 | 552.0 | 16.56 | 577.2 | 17.31 | 602.4 | 18.07 |
| 20 | 499.5 | 14.98 | 539.4 | 16.18 | 566.0 | 16.98 | 592.6 | 17.77 | 619.2 | 18.51 |
| 21 | 510.0 | 15.30 | 552.0 | 16.56 | 580.0 | 17.40 | 608.0 | 18.24 | 636.0 | 19.08 |
| 22 | 520.5 | 15.61 | 564.6 | 16.93 | 594.0 | 17.82 | 623.4 | 18.70 | 652.8 | 19.58 |
| 23 | 531.0 | 15.93 | 577.2 | 17.31 | 608.0 | 18.24 | 636.8 | 19.16 | 669.6 | 20.06 |
| 24 | 541.5 | 16.24 | 589.8 | 17.69 | 622.0 | 18.66 | 654.2 | 19.62 | 686.4 | 20.59 |
| 25 | 552.0 | 16.56 | 602.4 | 18.07 | 636.0 | 19.08 | 669.6 | 20.08 | 703.2 | 21.09 |
| 26 | 562.5 | 16.87 | 615.0 | 18.45 | 650.0 | 19.50 | 685.0 | 20.55 | 720.0 | 21.60 |
| 27 | 573.0 | 17.19 | 627.6 | 18.82 | 664.0 | 19.92 | 700.4 | 21.01 | 736.8 | 22.10 |
| 28 | 583.5 | 17.50 | 640.2 | 19.20 | 678.0 | 20.34 | 715.8 | 21.47 | 753.6 | 22.60 |
| 29 | 594.0 | 17.82 | 652.8 | 19.58 | 692.0 | 20.76 | 731.2 | 21.93 | 770.4 | 23.11 |
| 30 | 604.5 | 18.13 | 665.4 | 19.96 | 706.0 | 21.18 | 746.6 | 22.39 | 787.2 | 23.61 |
| 31 | 615.0 | 18.45 | 678.0 | 20.34 | 720.0 | 21.60 | 762.0 | 22.86 | 804.0 | 24.12 |
| 32 | 625.5 | 18.76 | 690.6 | 20.71 | 734.0 | 22.02 | 777.4 | 23.32 | 820.8 | 24.62 |
| 33 | 636.0 | 19.08 | 703.2 | 21.09 | 748.0 | 22.44 | 792.8 | 23.78 | 837.6 | 25.12 |
| 34 | 646.5 | 19.39 | 715.8 | 21.47 | 762.0 | 22.88 | 808.2 | 24.24 | 854.4 | 25.63 |
| 35 | 657.0 | 19.71 | 728.4 | 21.85 | 776.0 | 23.28 | 823.6 | 24.70 | 871.2 | 26.13 |
| 36 | 667.5 | 20.02 | 741.0 | 22.23 | 790.0 | 23.70 | 839.0 | 25.17 | 888.0 | 26.64 |
| 37 | 678.0 | 20.34 | 753.6 | 22.60 | 804.0 | 24.12 | 854.4 | 25.63 | 904.8 | 27.14 |
| 38 | 688.5 | 20.65 | 766.2 | 22.98 | 818.0 | 24.54 | 869.8 | 26.09 | 821.6 | 27.64 |
| 39 | 699.0 | 20.97 | 778.8 | 23.36 | 832.0 | 24.96 | 885.5 | 26.55 | 938.4 | 28.15 |
| 40 | 709.5 | 21.28 | 791.4 | 23.74 | 846.0 | 25.38 | 900.6 | 27.01 | 955.2 | 28.65 |
| 41 | 720.0 | 21.60 | 804.0 | 24.12 | 860.0 | 25.80 | 916.0 | 27.48 | 972.0 | 29.16 |
| 42 | 730.5 | 21.92 | 816.6 | 24.48 | 874.0 | 26.22 | 931.4 | 27.94 | 988.8 | 29.66 |
| 43 | 741.0 | 22.23 | 829.2 | 24.87 | 888.0 | 26.64 | 946.8 | 28.40 | 1005.6 | 30.16 |
| 44 | 751.5 | 22.54 | 841.8 | 25.25 | 902.0 | 27.06 | 962.2 | 28.86 | | |
| 45 | 762.0 | 22.86 | 854.4 | 25.63 | 916.0 | 27.48 | 977.6 | 29.32 | | |
| 46 | 772.5 | 23.16 | 867.0 | 26.01 | 930.0 | 27.90 | 993.0 | 29.79 | | |
| 47 | 783.0 | 23.49 | 879.6 | 26.38 | 944.0 | 28.32 | 1008.4 | 30.25 | | |
| 48 | 793.5 | 23.80 | 892.2 | 26.76 | 958.0 | 28.74 | | | | |
| 49 | 804.0 | 24.12 | 904.8 | 27.14 | 972.0 | 29.16 | | | | |
| 50 | 814.5 | 24.42 | 917.4 | 27.52 | 986.0 | 29.58 | | | | |

CHART VII
CHART SHOWING RELATIONSHIP BETWEEN BODY WEIGHT AND DRY MATTER CONSUMPTION PER HEAD PER DAY

-continued

| Week | Weight @ 1.5 lbs./day | Dry Matter/ Head/Day | Weight @ 1.8 lbs./day | Dry Matter/ Head/Day | Weight @ 2.0 lbs./day | Dry Matter/ Head/Day | Weight @ 2.2 lbs./day | Dry Matter/ Head/Day | Weight @ 2.4 lbs./day | Dry Matter/ Head/Day |
|---|---|---|---|---|---|---|---|---|---|---|
| 51 | 825.0 | 24.75 | 930.0 | 27.90 | 1000.0 | 30.00 | | | | |
| 52 | 835.5 | 25.06 | 942.6 | 28.27 | | | | | | |
| 53 | 846.0 | 25.38 | 955.2 | 28.65 | | | | | | |
| 54 | 856.5 | 25.69 | 967.8 | 29.03 | | | | | | |

CONCLUSION

The carbon credits may be marketed to refiners and businesses which generate greenhouse gases. The business can purchase the credits and be certified to sell an equivalent amount of fuel. Failure to market certified fuel or products will preclude the opportunity to market the products or alternatively will require payment of a double surtax for example.

There are numerous variations of the method and apparatus disclosed. The invention is thus limited only by the following claims and equivalents.

We claim:

1. A method for measuring and quantifying amounts of carbon sequestered in forage plant tissue above and below the soil surface, said method comprising the steps of:

establishing metes and bounds of a tract of land;

providing ruminant grazing animals to said tract;

initially recording initial animal condition;

compiling a database of information specific to the tract of land comprised of information on soil types, levels of fertility, inventories of forage plants, climatic conditions including growing degree days, length of growing season, rainfall and snowfall;

compiling a schedule for controlled defoliation by said ruminant grazing animals on said tract;

releasing said ruminant grazing animals in accord with the controlled defoliation schedule in the tract of land;

removing the ruminant grazing animals from the tract of land in accord with the schedule;

measuring changes in animal condition which occurred during the schedule;

measuring changes in plant condition which occurred during the schedule;

converting changes in animal condition to amounts of forage consumed from the specific tract of land; and further converting amounts of forage consumed by the ruminant grazing animal from the tract of land to amounts of carbon.

2. A method in accordance with claim 1 including equipping each animal with a DGPS signal generating device during the schedule wherein DGPS coordinates delineate grazing areas where carbon is sequestered, said DGPS signal device also measuring changing animal condition.

3. A method in accordance with claim 2 wherein the DGPS signal device also provides a record of animal movement in the tract.

4. A method for quantifying amounts of carbon sequestered in plant tissue by photosynthesis, comprising the steps of:

identifying metes, bounds and descriptions of a tract of land;

compiling information specific to the tract comprising information on soil types, levels of fertility, inventories of forage plants, climatic conditions including growing degree days, length of growing season, rainfall and snowfall;

compiling a schedule for controlled defoliation by mechanical means of plants on the tract;

defoliating at least in part, plants on the tract by mechanical means;

collecting the defoliated plant material; and compiling carbon credits from the defoliated plant material.

5. A method in accordance with claim 4 including the step of providing DGPS coordinates to delineate growing areas where carbon is sequestered.

6. A method in accordance with claim 4 wherein the difference between carbon dioxide released by any mechanical devices used in defoliation and carbon dioxide removed from the air by photosynthesis are compiled together to provide a net amount of carbon sequestered by the living plant in portions of a plant above and below ground level.

* * * * *

UNITED STATES PATENT AND TRADEMARK OFFICE
CERTIFICATE OF CORRECTION

PATENT NO. : 5,887,547
DATED : March 30, 1999
INVENTOR(S) : John D. Caveny, William K. Crispin, and Robert L. Conley It is certified that error appears in the above-identified patent and that said Letters Patent is hereby corrected as shown below:

Column 4, lines 31 and 33, the word "carbon" should be followed by the word --dioxide--.

Column 7, lines 45-54, beginning with "Annual Crops (e.g. corn)" and ending with "$5,121,600,000" should be placed in Chart IV at Column 8, line 47, after "(ethanol):"

Signed and Sealed this

Twenty-eighth Day of November, 2000

Attest:

Q. TODD DICKINSON

Attesting Officer

Director of Patents and Trademarks

UNITED STATES PATENT AND TRADEMARK OFFICE
CERTIFICATE OF CORRECTION

PATENT NO. : 5,887,547
DATED : March 30, 1999
INVENTOR(S) : John D. Caveny, William K. Crispin, and Robert L. Conley It is certified that error appears in the above-indentified patent and that said Letters Patent is hereby corrected as shown below:

On the title page: Item

[73] Assignee: reads "Enviromentally Correct Concepts, Inc., Monticello, Ill." and should read --Environmentally Correct Concepts, Inc., Monticello, Ill.--

Signed and Sealed this

Thirteenth Day of March, 2001

*Attest:*

NICHOLAS P. GODICI

*Attesting Officer*     *Acting Director of the United States Patent and Trademark Office*